(12) United States Patent
Joshi et al.

(10) Patent No.: US 10,237,593 B2
(45) Date of Patent: Mar. 19, 2019

(54) MONITORING QUALITY OF EXPERIENCE (QOE) AT AUDIO/VIDEO (AV) ENDPOINTS USING A NO-REFERENCE (NR) METHOD

(71) Applicant: Telefonaktiebolaget LM Ericsson (publ), Stockholm (SE)

(72) Inventors: Anand Arun Joshi, Campbell, CA (US); Sandesh Kashikar, Austin, TX (US); Bradley Holmes, San Jose, CA (US); Jose Maria Cubero, Santa Clara, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 238 days.

(21) Appl. No.: 15/192,839

(22) Filed: Jun. 24, 2016

(65) Prior Publication Data
US 2017/0347139 A1    Nov. 30, 2017

Related U.S. Application Data

(60) Provisional application No. 62/342,082, filed on May 26, 2016.

(51) Int. Cl.
*G06K 9/40* (2006.01)
*H04N 21/24* (2011.01)
(Continued)

(52) U.S. Cl.
CPC ......... *H04N 21/2402* (2013.01); *H04N 19/86* (2014.11); *H04N 21/233* (2013.01);
(Continued)

(58) Field of Classification Search
CPC .................. H04N 19/154; H04N 21/23418
See application file for complete search history.

(56) References Cited

U.S. PATENT DOCUMENTS 4,455,634 A  * 6/1984 Efron .................... G06F 11/277
                                                         369/53.41
6,901,209 B1 * 5/2005 Cooper .................. G10L 21/04
                                                         386/294
(Continued)

FOREIGN PATENT DOCUMENTS

GB          2470417 A      11/2010

OTHER PUBLICATIONS

Muhammad Shahid, Andreas Rossholm, Benny Lövström and Hans-Jürgen Zepernick, "No-reference image and video quality assessment: a classification and review of recent approaches", EURASIP Journal on Image and Video Processing 2014, 2014:40, 32 pages, (published before this application Jun. 2016).

(Continued)

*Primary Examiner* — Eueng-Nan Yeh
(74) *Attorney, Agent, or Firm* — Nicholson De Vos Webster & Elliott LLP

(57) ABSTRACT

Monitoring quality of experience (QoE) using a no-reference (NR) method. An uncompressed audio/video (AV) stream is received from output of a device under test (DUT), where the uncompressed AV stream includes content that is known to be devoid of a set of one or more AV artifacts. At least one of the set of AV artifacts is automatically tested for its existence using a no-reference method that does not use a comparison to an input reference AV stream. Upon determining that there is an AV event representing one of the set of AV artifacts based on the automatic testing, a video clip that includes the AV event is automatically generated. The automatically generated video clip is stored.

21 Claims, 10 Drawing Sheets

(51) Int. Cl.
    *H04N 21/442*     (2011.01)
    *H04N 21/234*     (2011.01)
    *H04N 21/233*     (2011.01)
    *H04N 19/86*     (2014.01)

(52) U.S. Cl.
    CPC . *H04N 21/23418* (2013.01); *H04N 21/44209* (2013.01); *H04N 21/44213* (2013.01)

(56) References Cited

U.S. PATENT DOCUMENTS

| | | | |
|---|---|---|---|
| 8,286,210 | B2 | 10/2012 | Boyden et al. |
| 8,456,531 | B2 | 6/2013 | Winkler |
| 9,307,178 | B2 | 4/2016 | Arling et al. |
| 2008/0036865 | A1 | 2/2008 | Liu |
| 2008/0126812 | A1* | 5/2008 | Ahmed ............. H04N 19/61 713/189 |
| 2012/0140081 | A1 | 6/2012 | Clements |
| 2013/0002887 | A1 | 1/2013 | Bruce-Smith |
| 2013/0347050 | A1 | 12/2013 | Friel |
| 2015/0334386 | A1* | 11/2015 | Brice ............. G06K 9/00979 348/180 |

OTHER PUBLICATIONS

Muhammad Arslan Usman, Muhammad Rehan Usman, Soo Young Shin, "The Impact of Temporal Impairment on Quality of Experience (QoE) in Video Streaming: A No Reference (NR) Subjective and Objective Study", Published in World Academy of Science, Engineering and Technology, International Journal of Computer, Electrical, Automation, Control and Information Engineering vol. 9, No. 8, 2015, pp. 1819-1826, (published before this application Jun. 2016).

Yuanyi Xue, Beril Erkin, Yao Wang, "A Novel No-reference Video Quality Metric for Evaluating Temporal Jerkiness due to Frame Freezing", IEEE Transactions on Multimedia, vol. 17, No. 1, Jan. 2015, pp. 134-139.

Stephen Wolf, "A no reference (nr) and reduced reference (rr) metric for detecting dropped video frames," in Fourth International Workshop on Video Processing and Quality Metrics for Consumer Electronics (VPQM-09), 2009, 7 pages, (published before this application Jun. 2016).

Hantao Liu, Ingrid Heynderickx, "A Perceptually Relevant No-Reference Blockiness Metric Based on Local Image Characteristics", EURASIP Journal on Advances in Signal Processing vol. 2009, Article ID 263540, 14 pages, (published before this application Jun. 2016).

Hantao Liu, Ingrid Heynderickx, "A No-Reference Perceptual Blockiness Metric", ICASSP 2008, pp. 865-868, (published before this application Jun. 2016).

Z. Wang, A. C. Bovik, B. L. Evans: "Blind measurement of blocking artifacts in images", in Proc. ICIP, vol. 3, pp. 981-984, Vancouver, Canada, 2000; and presentation for conference, 30 pages, (published before this application Jun. 2016).

Alan C. Bovik, Shizhong Liu, "DCT-Domain Blind Measurement of Blocking Artifacts in DCT-Coded Images", Acoustics, Speech, and Signal Processing, 2001, 4 pages, (published before this application Jun. 2016).

Final Office Action from U.S. Appl. No. 15/132,129, dated Jul. 21, 2017, 11 pages.

Final Office Action from U.S. Appl. No. 15/132,129, dated Jun. 5, 2018, 7 pages.

"Network Functions Virtualisation (NFV); Report on NFV interoperability test methodology; ETSI GS NFV-TST002," ETSI Draft; ETSI GS NFV-TST002, European Telecommunications Standards Institute (ETSI), 650, Route Des Lucioles; F-06921 Sophia-Antipolis; France, vol. ISG-NFV, No. V0.0.3, Feb. 18, 2015, pp. 1-24.

Non-Final Office Action from U.S. Appl. No. 15/132,129, dated Jan. 27, 2017, 15 pages.

Non-Final Office Action from U.S. Appl. No. 15/132,129, dated Nov. 9, 2017, 7 pages.

Pekovic V., et al., "Simultaneous Functionality Verification System of Multiple Set-Top Boxes," Engineering of Computer Based Systems (ECBS) 2012 IEEE 19th International Conference and Workshops on IEEE, Apr. 11, 2012, pp. 56-59.

\* cited by examiner

MONITORING QUALITY OF EXPERIENCE (QOE) AT AUDIO/VIDEO (AV) ENDPOINTS USING A NO-REFERENCE (NR) METHOD

CROSS-REFERENCE TO RELATED APPLICATIONS

This application claims the benefit of U.S. Provisional Application No. 62/342,082, filed May 26, 2016, which is hereby incorporated by reference.

FIELD

Embodiments of the invention relate to the field of testing electronic devices; and more specifically, to monitoring quality of experience (QoE) at audio/video (AV) endpoints using a no-reference (NR) method.

BACKGROUND

Tests are commonly performed when software is upgraded or changed to ensure that the software upgrade/change does not cause unexpected results. Many of these tests are historically performed manually and require significant time and expense. For instance, in the case of upgrading/changing software of a set-top box (STB), there can be thousands of test operations manually performed and verified, for each unique STB running that software. There is lot of dependency on manual verification of testing the uncompressed audio and video output of a device under test (DUT) such as a set-top box (STB), tablet, smartphones etc., which can be error prone. As a result, this may increase the test cycles significantly, especially for regression testing, impacting Time To Market requirements.

Example categories of testing performed for a STB include testing the power connection (power on/off, standby on/off), testing the High-Definition Multimedia Interface (HDMI) connection, testing commands to control the STB (e.g., Infrared commands, Bluetooth commands), testing audio and/or video quality, and testing the software to verify that it is operating as expected. These tests are typically manually intensive. For instance, testing the HDMI connection historically required someone to physically unplug and plug in the HDMI cable many times. As another example, some tests typically required a person physically watching a display connected to the STB in order to verify that the correct display and/or quality of display is being produced. Currently, there is no solution available to qualify a device under test (DUT) in an automated fashion using an outside-in approach that attempts to emulate human behavior.

Some testing solutions use a reference method where an input reference video stream is synchronized alongside the output of an AV endpoint and the two are compared. Such a solution has relatively high computation needs (e.g., synching the input reference video stream with the output of the AV endpoint), provisioning costs (e.g., setting up the sync of the input reference video stream and the output of the AV endpoint), frustration to the testers, and often requires the testers to watch the input reference video stream along with the output of the AV endpoint to compare the two.

Currently there is no way of continually monitoring the AV output of such devices to detect AV QoE issues using a no-reference (NR) method where the DUT are tuned to content through either a managed network or an unmanaged network at the end point of the video broadcast system where the end user experience is important.

In many present testing solutions that test live content, the DUT is tuned to the live content that is dynamic in nature, dependent on content provider, and may have errors embedded in it. Since the content itself may have issues, the test results may not give accurate assessment of the AV QoE produced by the DUT. Additionally, since the content may be copyrighted, it cannot be distributed to any external entity for STB qualification along with a test kit.

SUMMARY

An apparatus and method for monitoring quality of experience (QoE) using a no-reference (NR) method is described. An automation testing apparatus receives an uncompressed audio/video (AV) stream is received from the output of a device under test (DUT), where the uncompressed AV stream includes content that is known to be devoid of a set of one or more AV artifacts. The automation testing apparatus automatically tests for the existence of at least one of the set of one or more AV artifacts using a no-reference method that does not use a comparison to an input reference AV stream. Upon determining that there is an AV event representing one of the set of AV artifacts based on the automatic testing, the automation testing apparatus automatically generates a video clip that includes the AV event and stores the generated video clip.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
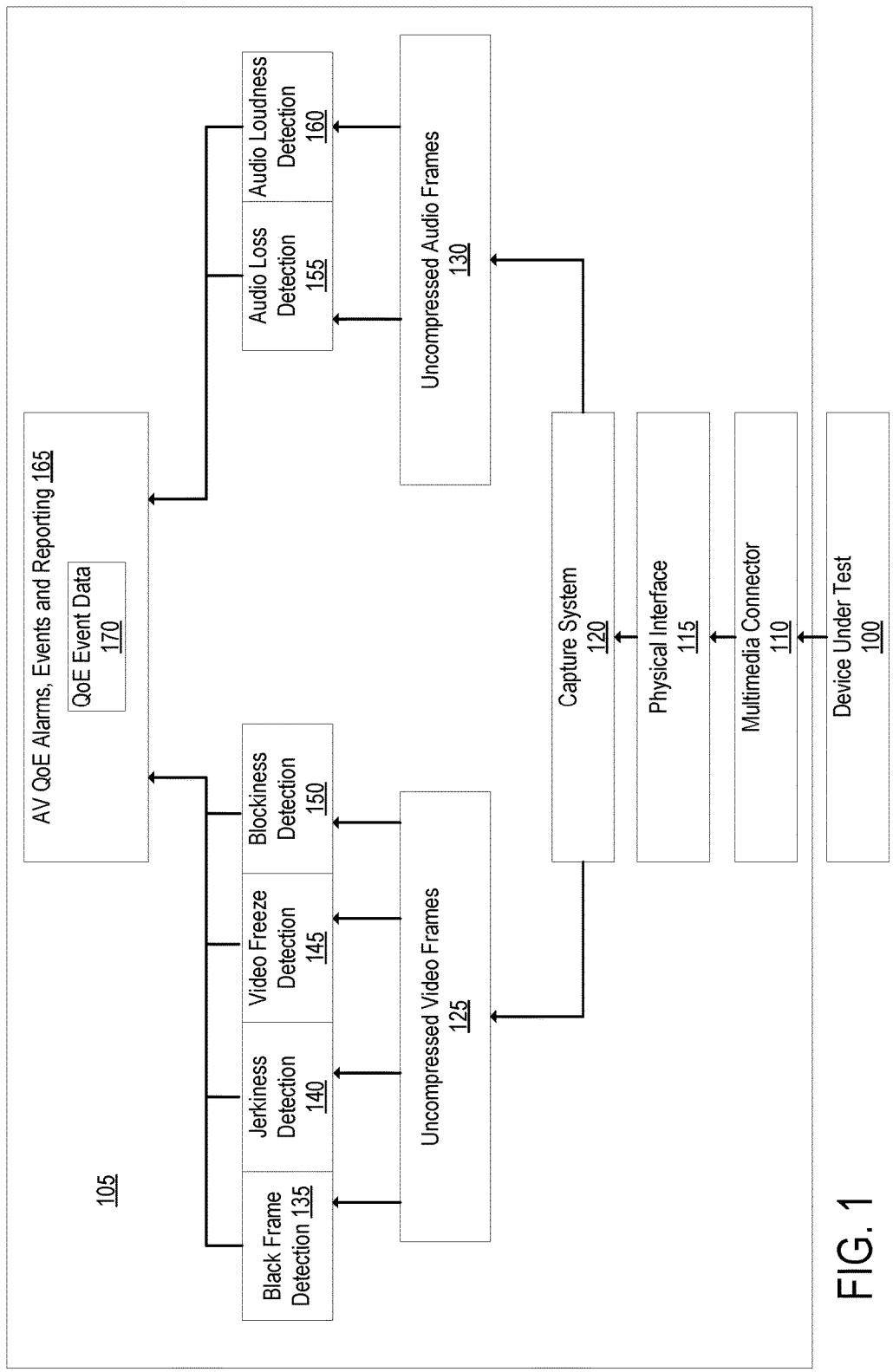
FIG. 1 is a block diagram that illustrates an apparatus for monitoring QoE at an AV endpoint using a no-reference (NR) method according to an embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An apparatus and method for monitoring quality of experience (QoE) at audio/video (AV) endpoints that decode an AV stream using a no-reference (NR) method. The automation testing apparatus captures uncompressed audio and video frames from the output of the DUT, analyzes the audio and video frames in real time using a no-reference (NR) method, and automatically detects commonly perceivable AV artifacts as perceived by a human visual/audio system (e.g., video freeze, black frames, jerkiness, macroblocks, audio loss, and/or audio loudness). The no-reference method does not use an input reference video stream and thus does not require a synchronization between the input reference video stream and the output of the AV endpoint. This no-reference method has lower computation needs as compared to a reference method (e.g., it does not require a synchronization of an input reference video stream with the output of the AV endpoint), and lower provisioning costs as compared to a reference method (e.g., it does not require setting up and verifying the synchronization of the input reference video stream with the output of the AV endpoint). The no-reference method is performed automatically and does not require human intervention to conduct the tests. Therefore, the no-reference method described herein can continually monitor the output of an AV endpoint to detect any QoE issue. Further, the automation testing apparatus enables automation of many test cases that would otherwise be typically performed manually, thereby significantly reducing Time to Market.

In an embodiment, the automation testing apparatus can also be used to verify common characteristics associated with AV output such as screen resolution, aspect ratio, and frame rate, which can assist in test and verification process of the AV endpoint decoding the video stream. For instance, to test the screen resolution, the automation testing apparatus may analyze each image to determine the number of pixels of each image and compare that number to the expected number of pixels for the expected screen resolution. As another example, to test the aspect ratio, the automation testing apparatus may analyze each image to determine the number of pixels of each image, the number of rows and columns of each image, and determine the aspect ratio by dividing the number of rows by the number of columns of pixel in the image. As another example, to test the frame rate, the automation testing apparatus may count the number of frames received per amount of time (e.g., per second).

In an embodiment, the AV stream that is tested by the automation testing apparatus is known to be devoid of the tested AV artifacts. For instance, the AV stream may be content that is known not to have any video freezes, black frames, jerkiness, macroblocks, audio loss, and/or audio loudness. Using such content allows the automation testing apparatus to better isolate any QoE issue that may occur as a result of the video distribution system or the AV endpoint itself. In an embodiment, the tested AV may be non-copyrighted and thus can be distributed freely to any external entity along with a porting kit to qualify an AV endpoint such as a STB.

In an embodiment, the automation testing apparatus automatically captures and stores any detected AV artifact(s), such as in a video clip. The video clip can be used by a tester or other user to review the detected AV artifact(s), which may help that tester or user verify and/or troubleshoot the problem. These video clip(s) can also be used by the service provider to ensure high quality of experience is being provided to an end user thereby increasing customer satisfaction.

FIG. 1 is a block diagram that illustrates an apparatus for monitoring QoE at an AV endpoint using a no-reference (NR) method according to an embodiment. The automation testing apparatus 105 includes a multimedia connector 110 that connects to output of the device under test (DUT) 100. The DUT 100 may be a workstation, laptop, portable medial player, gaming system, set top box, global positioning system (GPS) unit, smartphone, Internet enabled appliance, etc. The multimedia connector 110 may be, for example, a High-Definition Multimedia Interface (HDMI) connector that receives an AV stream from the DUT 100, or other types of multimedia connectors (e.g., Digital Video Interface (DVI) connector, DisplayPort connector, etc.). The AV stream may be known to be devoid of any AV artifacts, in an embodiment. The AV stream may be non-copyrighted and thus can be freely distributed.

The output of the DUT 100, as received through the multimedia connector 110, may be encrypted. For instance, AV received over HDMI is often encrypted. The physical interface 115 decrypts the encrypted AV and outputs the unencrypted AV stream to the capture system 120. The capture system 120 may be an AV capture card that can process the unencrypted AV stream. For instance, the capture system 120 divides the AV stream into uncompressed video frames 125 and uncompressed audio frames 130.

From the uncompressed video frames, the automation testing apparatus (105) 105 may perform a number of tests to automatically detect common visible artifacts including black frame detection 135, jerkiness detection 140, video freeze detection 145, and/or blockiness detection 150, all using a NR method. A black frame video artifact involves one or more black frames (or frame(s) that are below a luminance threshold). A jerkiness artifact is where the video appears to be jerky or jittery. A video freeze artifact is where the video appears to freeze. A blockiness artifact is where the video appears to be blocky or pixelated. Using the uncompressed audio frames, the automation testing apparatus (105) 105 may perform a number of tests to automatically detect common audible artifacts including audio loss detection 155 and audio loudness detection 160. An audio loss artifact is where the audio is lost or falls below a threshold. An audio loudness artifact is where the audio is unexpectedly louder. It should be understood that number of artifacts tested by the automation testing apparatus (105) 105 is exemplary and the automation testing apparatus (105) 105 need not perform all of the AV artifacts test described herein and/or may perform different AV artifacts test.

Any detected QoE event may be processed by the AV QoE alarms, events, and reporting module 165. In one example, the AV QoE alarms, events, and reporting module 165 automatically captures and stores any detected AV artifact(s), such as in a video clip. The video clip can be used by a tester or other user to review the detected AV artifact(s), which may help that tester or user verify and/or troubleshoot the problem. These video clip(s) can be used by the service provider to ensure high quality of experience is being provided to an end user thereby increasing customer satisfaction. The AV QoE alarms, events, and reporting module 165 stores information related to the QoE events in the QoE event data store 170. The QoE event data store 170 may include the generated video clips for the QoE event and information related to the QoE event. The QoE event data store 170 may also store statistics of the QoE events such as the number of QoE events (which may be counted separately per type of QoE event), the duration of the QoE events (which may be separated per type of QoE event), the settings of the automation testing apparatus (105) 105 when performing the tests (e.g., the value of the different thresholds as described herein, the expected frame rate of the video being tested, the expected screen resolution of the video being tested, the expected maximum volume of the audio being tested, and other information about the AV being tested. The data from the AV QoE alarms, events, and reporting module can be integrated into a service provider's operations support systems (OSS) and/or analytics system.

Figure 2:
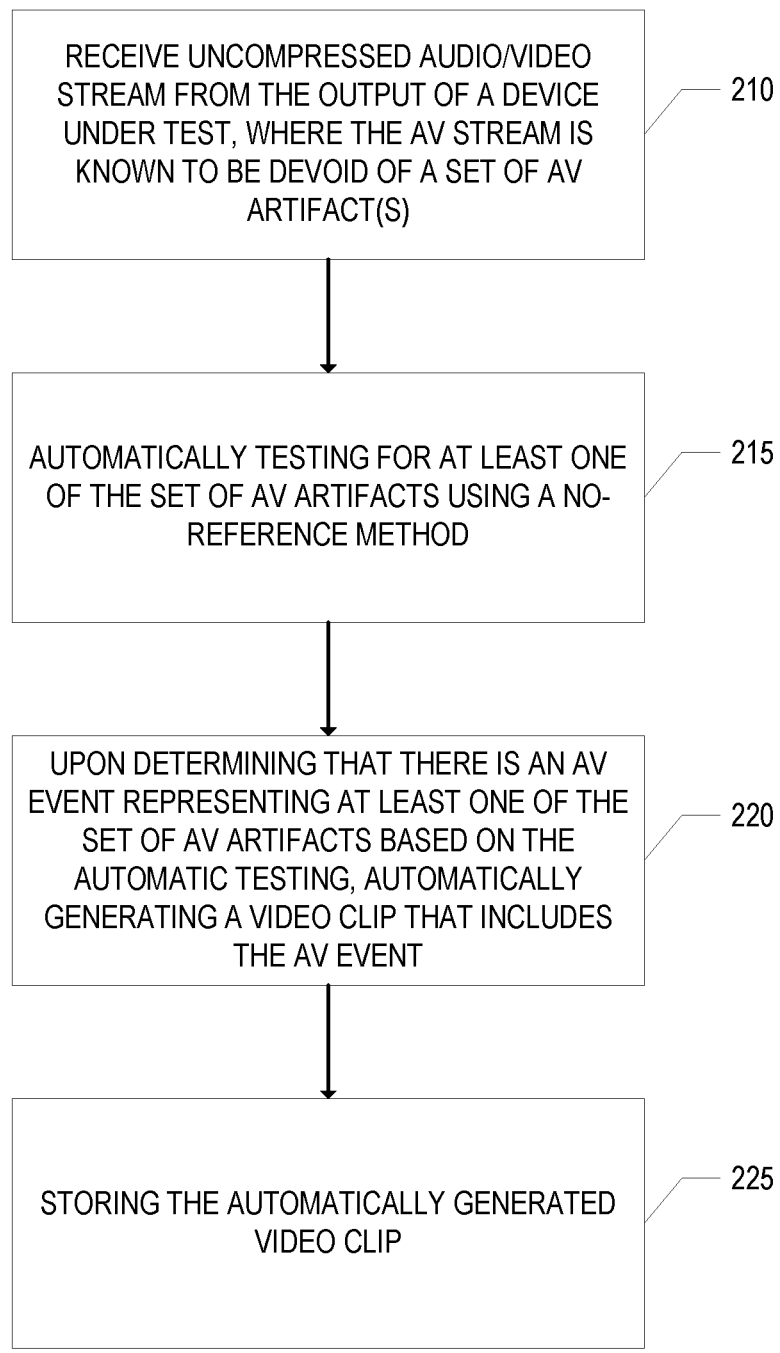
FIG. 2 is a flow diagram that illustrates exemplary operations performed by the automation testing apparatus for monitoring QoE using an NR method, according to an embodiment.

FIG. 2 is a flow diagram that illustrates exemplary operations performed by the automation testing apparatus (105) 105 for monitoring QoE using an NR method, according to an embodiment. The operations of FIG. 2, and the other flow diagrams, will be described with reference to the exemplary embodiment of FIG. 1. However, it should be understood that the operations of FIG. 2 and the other flow diagrams can be performed by different embodiments than those described with reference to FIG. 1, and the embodiment described with reference to FIG. 1 can perform operations different than those described in reference to FIG. 2 and the other flow diagrams.

At operation 210, the automation testing apparatus (105) 105 receives an uncompressed audio/video (AV) stream from the output of the device under test 100. The uncompressed AV stream is known to be devoid of a set of one more AV artifacts in which the automation testing apparatus (105) 105 will test. With reference to FIG. 1, the AV stream is received through the multimedia connector 110 and may be decrypted by the physical interface 115. The capture system 120 may then process the AV stream and divide it into uncompressed video frames and uncompressed audio frames. Flow moves from operation 210 to operation 215.

At operation 215, the automation testing apparatus (105) 105 automatically tests for at least one of the set of AV artifacts using a no-reference method. The no-reference method does not use an input reference AV stream to compare and/or synchronize with the received AV stream. Examples of the AV artifacts that the automation testing apparatus (105) 105 may test include one or more of blockiness, video freeze, jerkiness, black frame, audio loss, and audio loudness. Exemplary operations for performing the tests will be described with respect to FIGS. 3-8. Flow moves from operation 215 to operation 220.

If the result of the testing concludes that there is at least one AV artifact, the automation testing apparatus (105) 105 generates a video clip that includes the AV artifact. The video clip can be used by a tester or other user to review the detected AV artifact(s), which may help that tester or user verify and/or troubleshoot the problem. Thus, at operation 220, upon determining that there is an AV event representing at least one of the set of AV artifacts based on the automatic testing, a video clip is automatically generated that includes the AV event. The video clip may include a number of frames before and after the start of the AV event in order to provide context for the AV event. Example operations for generating a video clip that includes the AV artifact will be described with respect to FIG. 9. Flow moves from operation 220 to operation 225, where the automatically generated video clip is stored on the automation testing apparatus (105) 105. The video clip can be accessed locally on the automation testing apparatus (105) 105 and/or be transmitted to another device for review.

Figure 3:
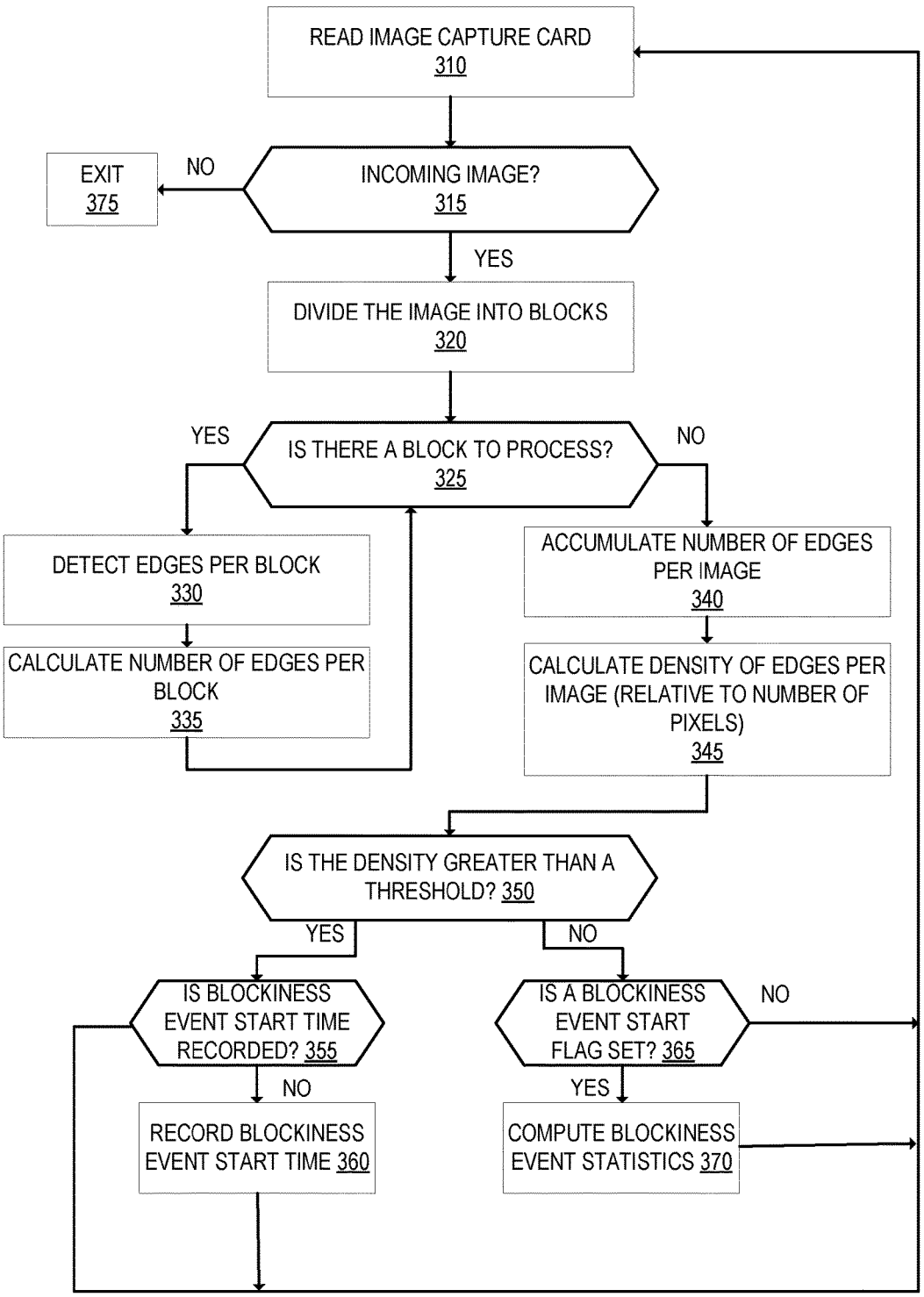
FIG. 3 is a flow diagram that illustrates exemplary operations performed by the automation testing apparatus to detect blockiness according to an embodiment.

FIG. 3 is a flow diagram that illustrates exemplary operations performed by the automation testing apparatus (105) 105 to detect blockiness according to an embodiment. At operation 310, the image capture card is read. Next, at operation 315, if there is an incoming image, then flow moves to operation 320, otherwise flow moves to operation 375 and operations end. The incoming image may be a YUV image. At operation 320, the image is divided into blocks. For example, the image may be divided into a fixed number of blocks (e.g., 8 by 8 for a total of 64 blocks). Then, at operation 325, if there is a block to process, then flow moves to operation 330 where the edges of the block are detected. The edge detection may use any number of edge detecting techniques such as Sobel filtering, Canny edge detector, Deriche edge detector, and Differential edge detection. Next, at operation 335, the number of edges per block is calculated and flow moves back to operation 325. If all of the blocks have been processed, then flow moves to operation 340 where the number of edges for the image is accumulated based on the calculated number of edges for each block.

Next, at operation 345, the density of the edges of the image (relative to the number of pixels for the image) is calculated. For instance, for each block, the number of pixels belonging to an edge is determined (using an edge detection technique). The number of pixels belonging to an edge is divided by the total number of pixels of the block. The rate of samples on an edge per blocked is accumulated across the image, and divided by the number of blocks, which is the density of the edges of the image.

Next, at operation 350, a determination is made whether the computed density is greater than a blockiness threshold that indicates that the image is perceivably blocky. The value of the blockiness threshold may be based on trial and error. For instance, an operator of the automation testing apparatus (105) 105 may set the blockiness threshold and evaluate the results to determine its success, including any false positives, and adjust the threshold accordingly. If the computed density is greater than the blockiness threshold, then flow moves to operation 355, otherwise flow moves to operation 365. The amount of blockiness for the image may be recorded as the computed density.

At operation 355 (the density is greater than the density threshold), a determination is made whether the blockiness event start time has been recorded. If the blockiness event start time has been recorded (e.g., stored in the blockiness event statistics in memory), then flow moves back to operation 310. If the blockiness event start time has not been recorded, then flow moves to operation 360 where the blockiness event start time is recorded and then flow moves back to operation 310. In addition to recording the blockiness event start time, a blockiness event start flag may be set that indicates that a blockiness QoE event may be underway.

At operation 365 (the density is not greater than the density threshold), a determination is made whether the blockiness event start flag has been set. If the blockiness event start flag is not set, then flow moves back to operation 310 (a blockiness event has not been detected). If the blockiness event start flag is set (meaning that a blockiness QoE event was underway but is likely over), then flow moves to operation 370 where a set of one or more blockiness event statistics is computed. By way of example, the blockiness event statistics that may be computed include: recording the blockiness endtime (equal to the receipt of the current image); computing the blockiness duration (equal to the time elapsed since the first image of the blockiness QoE event and the last image of the blockiness QoE event); incrementing the blockiness QoE event counter; and/or calculating and storing the number of images of the blockiness QoE event. The blockiness event start flag may also be cleared. The blockiness event statistics and state of the blockiness event start flag may be stored in the QoE event data store 170. Flow then moves from operation 370 back to operation 310.

As previously described, one of the AV artifacts that may be detected by the automation testing apparatus (105) 105 using a no-reference method is a video freeze artifact. The automation testing apparatus (105) 105 compares the pixel values of the current image with the pixel values of the most immediately previous image. The automation testing apparatus (105) 105 determines that a video freeze artifact exists when a difference between the pixel values of the current image and the pixel values of the most immediately previous image is below a threshold that indicates that the current image is perceivably the same as the most immediately previous image. To say it another way, the automation testing apparatus (105) 105 may determine that a video freeze artifact exists if it determines that the current image and the previous image are perceivably the same to a human.

Figure 4:
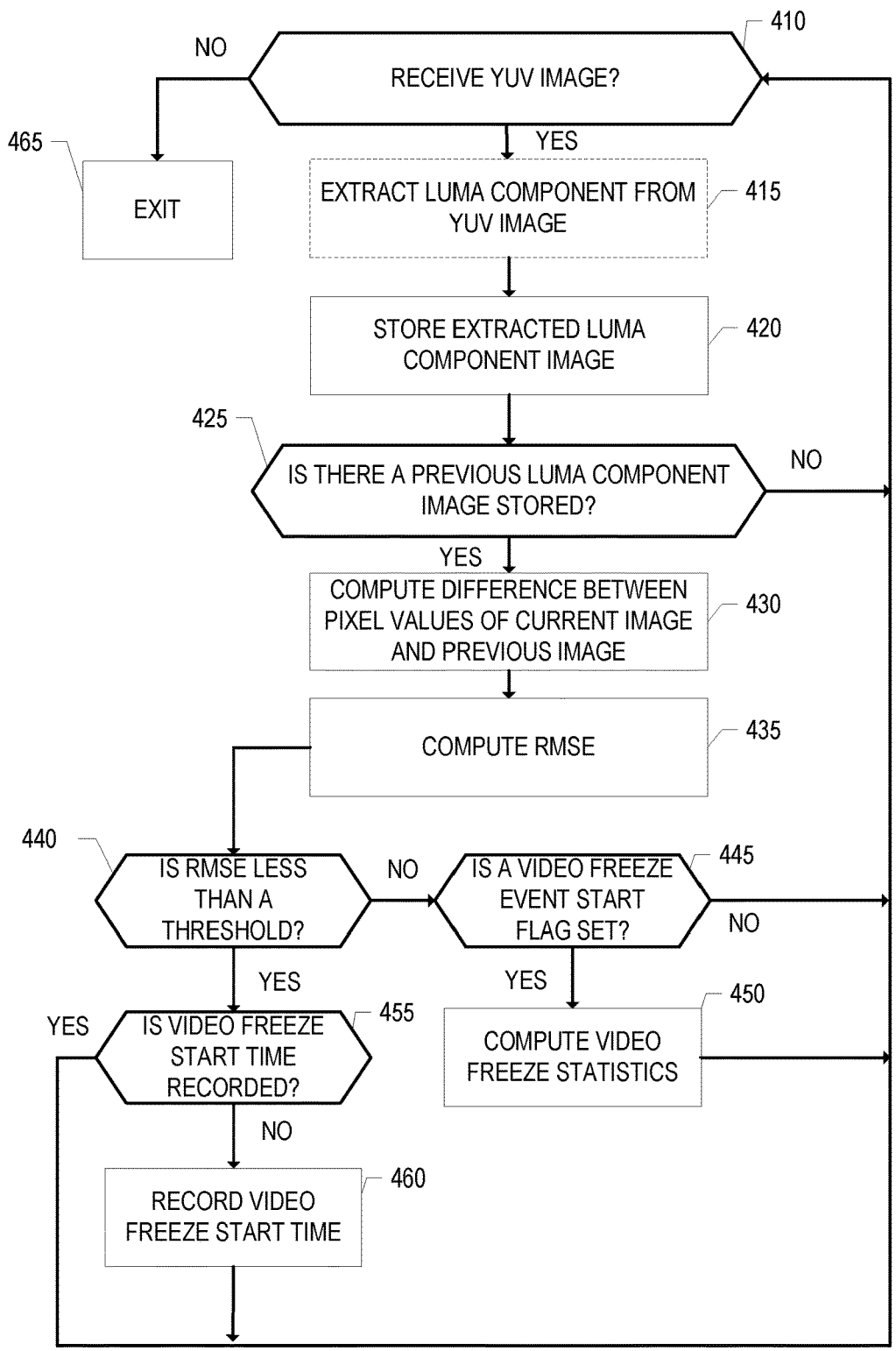
FIG. 4 is a flow diagram that illustrates exemplary operations performed by the automation testing apparatus to detect a video freeze artifact according to an embodiment.

FIG. 4 is a flow diagram that illustrates exemplary operations performed by the automation testing apparatus (105) 105 to detect a video freeze artifact according to an embodiment. At operation 410, a determination is made whether an YUV image is received. An YUV image includes a value for luminance or luma (Y) and two values for chrominance (color) (U and V). If there is a YUV image, then flow moves to operation 415, otherwise flow moves to operation 465 where operations end. At operation 415, which is optional in an embodiment, the luma component is extracted from the YUV image. This removes the color from the image. Next, at operation 420, the extracted luma component image is stored in the automation testing apparatus (105) (e.g., in memory). Next, at operation 425, a determination is made whether there is a previous luma component image stored for this video stream. If there is not, then flow moves back to operation 410. If there is such an image stored, then flow moves to operation 430 where the difference between pixel values of the current image and the previous image is computed. In an embodiment, the L2 norm of difference is computed in operation 430. Next, at operation 435, the root mean square error (RMSE) is computed on the computed difference. Next, at operation 440, a determination is made whether the computed RMSE is less than a threshold. If it is not less than the threshold, then flow moves to operation 445. If it is less than the threshold, then flow moves to operation 455. If the computed RMSE is less than the threshold, then it is likely that the two images are similar enough to be experiencing a video freeze. The value of the threshold is set based on trial and error according to an embodiment. For instance, an operator of the automation testing apparatus (105) may set the threshold and evaluate the results to determine its success including any false positives and adjust the threshold accordingly.

At operation 455 (the RMSE is less than the threshold), a determination is made whether the video freeze start time has been recorded. If the video freeze start time has been recorded (e.g., stored in the video freeze statistics in memory), then flow moves back to operation 410. If the video freeze start time has not been recorded, then flow moves to operation 460 where the video freeze start time is recorded and then flow moves back to operation 410. In addition to recording the video freeze start time, a video freeze event start flag may be set that indicates that a video freeze QoE event may be underway.

At operation 445 (the RMSE is not less than the threshold), a determination is made whether the video freeze event start flag has been set. If the video freeze event start flag is not set, then flow moves back to operation 410 (a video freeze has not been detected between the current image and the previous image). If the video freeze event start flag is set (meaning that a video freeze QoE event was underway but is likely over), then flow moves to operation 450 where a set of one or more video freeze statistics is computed. By way of example, the video freeze statistics that may be computed include: recording the video freeze endtime (equal to the receipt of the current image); computing the video freeze duration (equal to the time elapsed since the first image of the video freeze QoE event and the last image of the video freeze QoE event); incrementing the video freeze QoE event counter; and/or calculating and storing the number of images of the video freeze QoE event. The video freeze event start flag may also be cleared. The video freeze statistics and state of the video freeze event start flag may be stored in the QoE event data store 170. Flow then moves from operation 450 back to operation 410.

As previously described, one of the AV artifacts that may be detected by the automation testing apparatus (105) 105 using a no-reference method is a jerkiness artifact. The automation testing apparatus (105) 105 compares the arrival time of a current image with the arrival time of the most immediately previous image to determine an observed framerate. The automation testing apparatus (105) 105 computes the difference between the observed framerate and the expected framerate of the AV stream. The automation testing apparatus (105) 105 determines that the jerkiness artifact exists when the difference between the observed framerate and the expected framerate is greater than a tolerance threshold that indicates that the observed framerate is perceivably different than the expected framerate. To say it another way, the automation testing apparatus (105) 105 may determine that a jerkiness artifact exists when the observed framerate is perceptibly different (typically slower but could be higher) to a human than the expected framerate.

Figure 5:
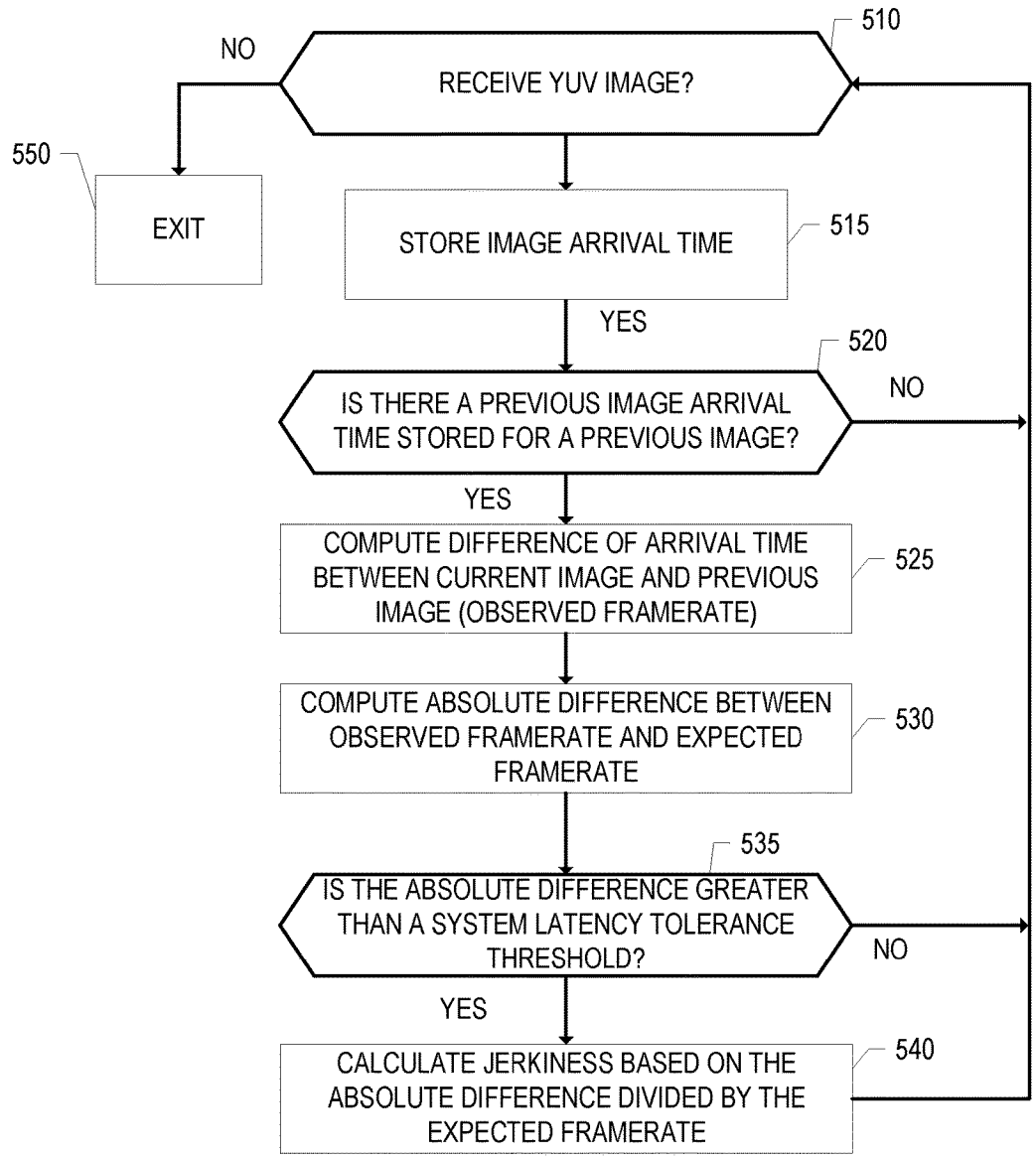
FIG. 5 is a flow diagram that illustrates exemplary operations performed by the automation testing apparatus to detect a jerkiness artifact according to an embodiment.

FIG. 5 is a flow diagram that illustrates exemplary operations performed by the automation testing apparatus (105) 105 to detect a jerkiness artifact according to an embodiment. At operation 510, a determination is made whether an YUV image is received. If there is a YUV image, then flow moves to operation 515, otherwise flow moves to operation 550 where operations end. At operation 515, the image arrival time is stored (e.g., in memory). Next, at operation 520, a determination is made whether there is a previous image arrival time stored for the previous image. If there is, then flow moves to operation 525, otherwise flow moves back to operation 510. At operation 525, the difference of arrival time between the current image and the previous image is computed, which is referred to as the observed framerate. Next, at operation 530, the absolute difference between the observed framerate and the expected framerate is computed. The expected or theoretical framerate is established based on the content being tested. For example, if the content being tested is 60 frames per second, then the expected or theoretical framerate is 60 frames per second.

Flow then moves to operation 535 where a determination is made whether the absolute difference between the observed framerate and the expected framerate is greater than a system latency tolerance threshold. The value of the system latency tolerance threshold is set based on trial and error according to an embodiment. For instance, an operator of the automation testing apparatus (105) may set the system latency tolerance threshold and evaluate the results to determine its success including any false positives and adjust the threshold accordingly. If the absolute difference is greater than the system latency threshold, then flow moves to operation 540 where a jerkiness value is calculated based on the absolute difference divided by the expected framerate. The jerkiness value may be stored in the QoE event data store 170. If the absolute difference is not greater than the system latency threshold, then flow moves back to operation 510.

As previously described, one of the AV artifacts that may be detected by the automation testing apparatus (105) 105 using a no-reference method is a black frame artifact. The automation testing apparatus (105) 105 computes the average pixel value of an image and the standard deviation of the pixel values of the image. The automation testing apparatus (105) 105 determines that a black frame artifact exists when the computed average is below a luminance threshold and the computed standard deviation is less than a deviation threshold that indicates that the current image is perceivably a black frame. To say it another way, the automation testing apparatus (105) 105 may determine that a black frame artifact exists if it determines that the current image is perceivably a black frame to a human.

Figure 6:
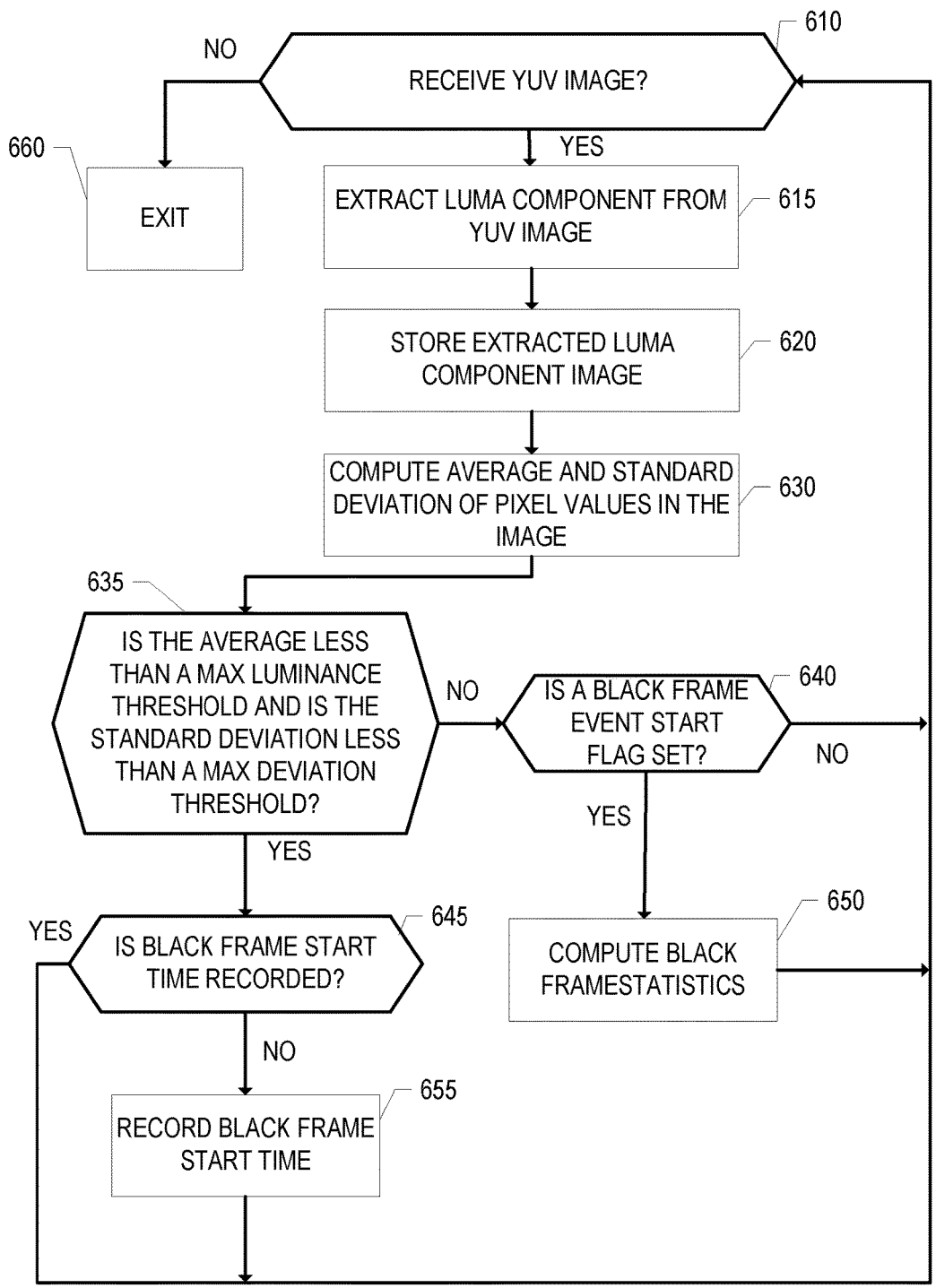
FIG. 6 is a flow diagram that illustrates exemplary operations performed by the automation testing apparatus to detect a black frame artifact according to an embodiment.

FIG. 6 is a flow diagram that illustrates exemplary operations performed by the automation testing apparatus (105) 105 to detect a black frame artifact according to an embodiment. At operation 610, a determination is made whether an YUV image is received. If there is a YUV image, then flow moves to operation 615, otherwise flow moves to operation 660 where operations end. At operation 615, the luma component is extracted from the YUV image. This removes the color from the image. Next, at operation 620, the extracted luma component image is stored in the automation testing apparatus (105) (e.g., in memory). Next, at operation 630, the average and standard deviation of the pixel values in the extracted luma component image is computed.

Next, at operation 635, a determination is made whether the average pixel value is less than a maximum luminance threshold and whether the standard deviation of the pixel values is less than a maximum standard deviation threshold. The value of the maximum luminance threshold and the value of the maximum standard deviation threshold are set based on trial and error, according to an embodiment. For instance, an operator of the automation testing apparatus (105) may set these thresholds and evaluate the results to determine the success of the test including any false positives, and adjust the thresholds accordingly. If the average pixel value is less than the maximum luminance threshold and the standard deviation is less than the maximum standard deviation threshold, then flow moves to operation 645, otherwise flow moves to operation 640.

At operation 645, a determination is made whether the black frame start time has been recorded. If the black frame start time has been recorded (e.g., stored in the black frame statistics in memory), then flow moves back to operation 610. If the black frame start time has not been recorded, then flow moves to operation 655 where the black frame start time is recorded and then flow moves back to operation 610. In addition to recording the black frame start time, a black frame event start flag may be set that indicates that a black frame QoE event may be underway.

At operation 640, a determination is made whether the black frame event start flag has been set. If the black frame event start flag is not set, then flow moves back to operation 610 (a black frame has not been detected between the current image and the previous image). If the black frame event start flag is set (meaning that a black frame QoE event was underway but is likely over), then flow moves to operation 650 where a set of one or more black frame statistics is computed. By way of example, the black frame statistics that may be computed include: recording the black frame end-time (equal to the receipt of the current image); computing the black frame event duration (equal to the time elapsed since the first image of the black frame QoE event and the last image of the black frame QoE event); incrementing the black frame QoE event counter; and/or calculating and storing the number of images of the black frame QoE event. The black frame event start flag may also be cleared. The black frame statistics and state of the black frame event start flag may be stored in the QoE event data store 170. Flow then moves back to operation 610.

As previously described, one of the AV artifacts that may be detected by the automation testing apparatus (105) 105 using a no-reference method is an audio loss artifact. The automation testing apparatus (105) 105 computes the audio level (e.g., in decibels) of an audio frame. The automation testing apparatus (105) 105 determines that an audio loss artifact exists when the computed audio level is equal or substantially equal to an audio level that cannot be perceived by a human (e.g., −90 dB). To say it another way, the automation testing apparatus (105) 105 may determine that an audio loss artifact exists if it determines that the audio level of an audio frame cannot be heard by a human.

Figure 7:
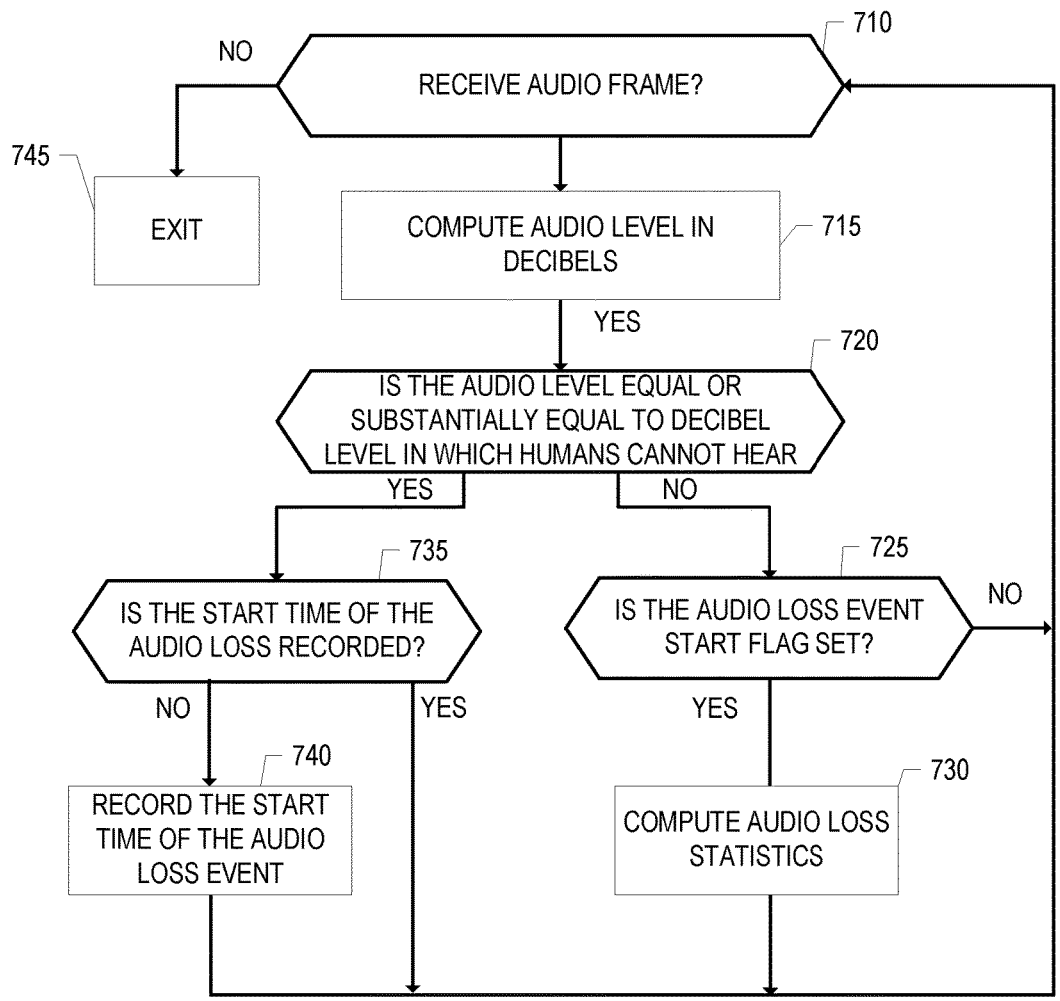
FIG. 7 is a flow diagram that illustrates exemplary operations performed by the automation testing apparatus to detect an audio loss artifact according to an embodiment.

FIG. 7 is a flow diagram that illustrates exemplary operations performed by the automation testing apparatus (105) 105 to detect an audio loss artifact according to an embodiment. At operation 710, a determination is made whether an audio frame is received. If there is an audio frame, then flow moves to operation 715, otherwise flow moves to operation 745 where operations end. At operation 715, the audio level is computed (e.g., in decibels). For instance, the audio is decoded and the amplitude of the obtained wave is measured in decibels. Next, at operation 720, a determination is made whether the computed audio level is equal or substantially equal to a decibel level that humans cannot hear. By way of example, this decibel level may be equivalent to −90 dB. If the audio level is equal or substantially equal to the decibel level that humans cannot hear, then flow moves to operation 735, otherwise flow moves to operation 725.

At operation 735 (the audio frame has an audio level that a human cannot hear), a determination is made whether the start time of the audio loss has been recorded. If the start time of the audio loss has been recorded (e.g., stored in the audio loss statistics in memory), then flow moves back to operation 710. If the start time of the audio loss has not been recorded, then flow moves to operation 740 where the start time of the audio loss is recorded and then flow moves back to operation 710. In addition to recording the start time of the audio loss, an audio loss event start flag may be set that indicates that an audio loss QoE event may be underway.

At operation 725, a determination is made whether the audio loss event start flag has been set. If the audio loss event start flag is not set, then flow moves back to operation 710 (an audio loss QoE event is not currently underway). If the audio loss event start flag is set (meaning that an audio loss QoE event was underway but is likely over), then flow moves to operation 730 where a set of one or more audio loss statistics is computed. By way of example, the audio loss statistics that may be computed include: recording the audio loss endtime (equal to the receipt of the current audio frame); computing the audio loss duration (equal to the time elapsed since the first audio frame of the audio loss QoE event and the last audio frame of the audio loss QoE event); incrementing the audio loss QoE event counter; and/or calculating and storing the number of audio frames of the audio loss QoE event. The audio loss event start flag may also be cleared. The audio loss statistics and state of the audio loss event start flag may be stored in the QoE event data store 170. Flow then moves back to operation 710.

As previously described, one of the AV artifacts that may be detected by the automation testing apparatus (105) 105 using a no-reference method is an audio loudness artifact. The automation testing apparatus (105) 105 computes the audio level (e.g., in decibels) of an audio frame. The automation testing apparatus (105) 105 determines that an audio loudness artifact exists when the computed audio level is greater than a threshold that indicates the audio level of the audio frame is perceivably louder than expected. To say it another way, the automation testing apparatus (105) 105 may determine that an audio loudness artifact exists if it determines that the audio level of an audio frame is perceivably louder to a human that expected.

Figure 8:
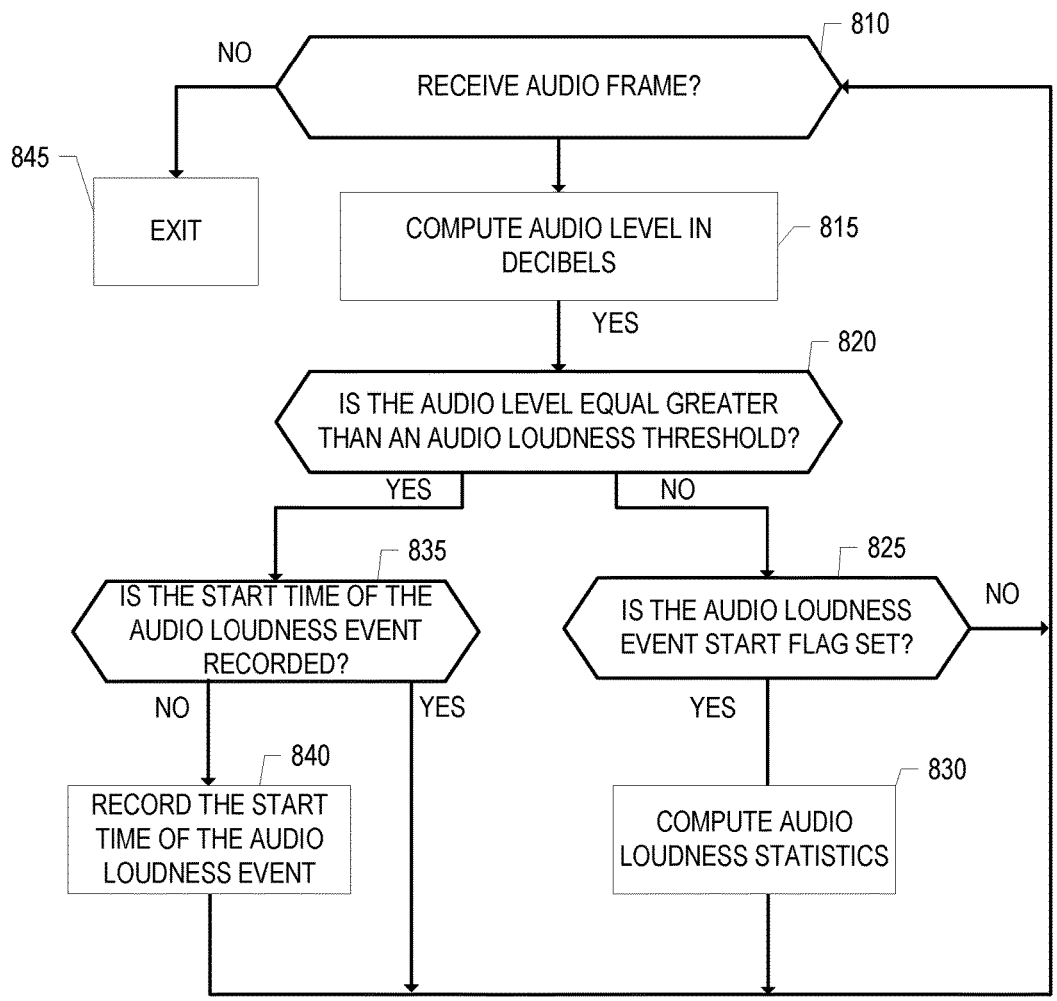
FIG. 8 is a flow diagram that illustrates exemplary operations performed by the automation testing apparatus to detect an audio loudness artifact according to an embodiment

FIG. 8 is a flow diagram that illustrates exemplary operations performed by the automation testing apparatus (105) 105 to detect an audio loudness artifact according to an embodiment. At operation 810, a determination is made whether an audio frame is received. If there is an audio frame, then flow moves to operation 815, otherwise flow moves to operation 845 where operations end. At operation 815, the audio level is computed (e.g., in decibels). Next, at operation 820, a determination is made whether the computed audio level is greater than an audio loudness threshold. The value of the audio loudness threshold may be set by an operator of the automation testing apparatus (105) and adjusted as needed. For instance, the value of the audio loudness threshold may be set at the expected maximum loudness of the audio frame or within a tolerance of the expected maximum loudness of the audio frame in which a human could perceive. If the audio level is greater than the audio loudness threshold, then flow moves to operation 835, otherwise flow moves to operation 825.

At operation 835 (the audio frame has an audio level that is above the audio loudness threshold), a determination is made whether the start time of the audio loudness event has been recorded. If the start time of the audio loudness event has been recorded (e.g., stored in the audio loudness event statistics in memory), then flow moves back to operation 810. If the start time of the audio loudness event has not been recorded, then flow moves to operation 840 where the start time of the audio loudness event is recorded and then flow moves back to operation 810. In addition to recording the start time of the audio loudness event, an audio loudness event start flag may be set that indicates that an audio loudness QoE event may be underway.

At operation 825 (the audio frame has an audio level that is below the audio loudness threshold), a determination is made whether the audio loudness event start flag has been set. If the audio loudness event start flag is not set, then flow moves back to operation 810 (an audio loudness QoE event is not currently underway). If the audio loudness event start flag is set (meaning that an audio loudness QoE event was underway but is likely over), then flow moves to operation 830 where a set of one or more audio loudness statistics is computed. By way of example, the audio loudness statistics that may be computed include: recording the audio loudness endtime (equal to the receipt of the current audio frame); computing the audio loudness duration (equal to the time elapsed since the first audio frame of the audio loudness QoE event and the last audio frame of the audio loudness QoE event); incrementing the audio loudness QoE event counter; and/or calculating and storing the number of audio frames of the audio loudness QoE event. The audio loudness event start flag may also be cleared. The audio loudness statistics and state of the audio loudness event start flag may be stored in the QoE event data store 170. Flow then moves back to operation 810.

Figure 9:
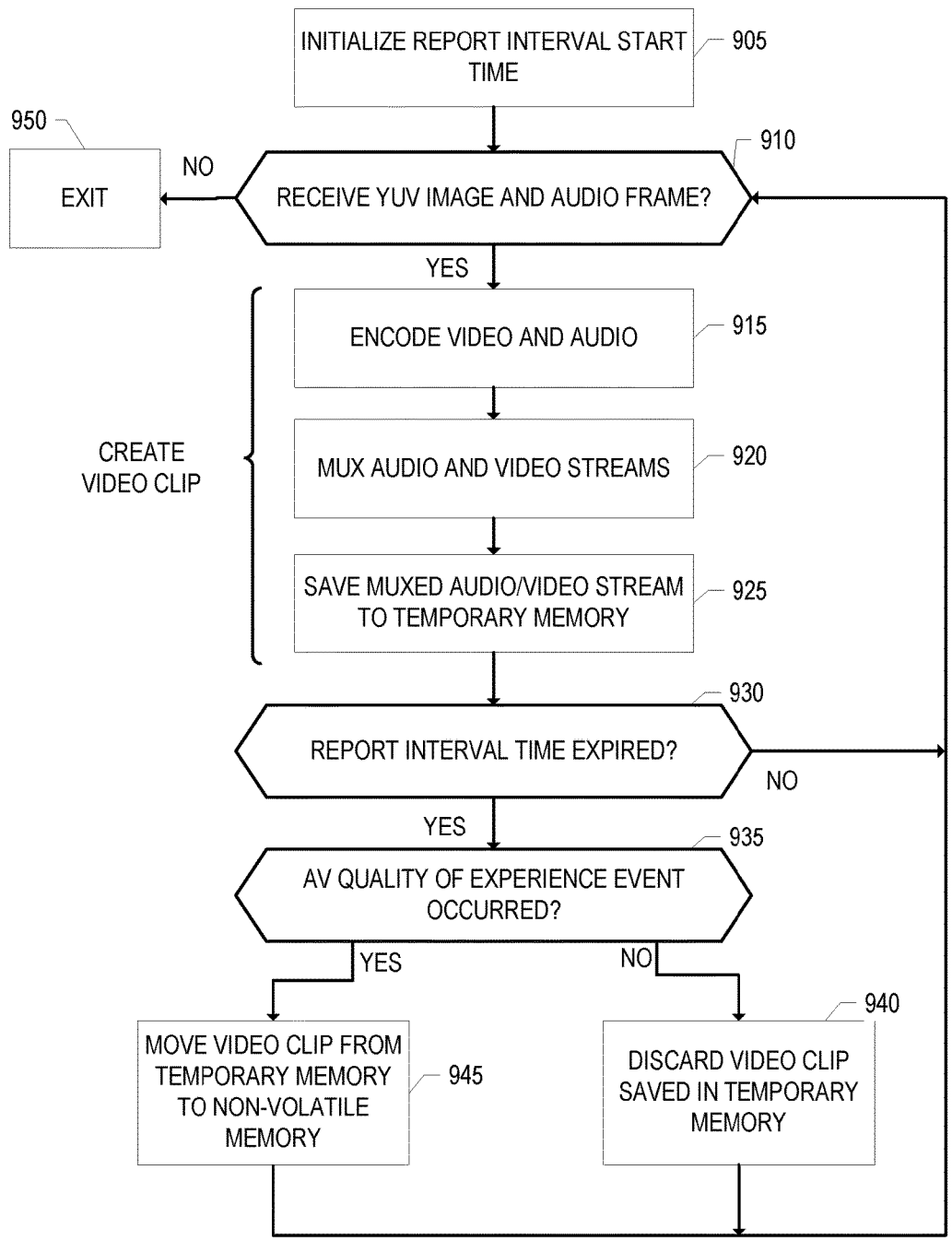
FIG. 9 is a flow diagram that illustrates exemplary operations performed by the automation testing apparatus to capture a QoE event through a video clip according to an embodiment.

FIG. 9 is a flow diagram that illustrates exemplary operations performed by the automation testing apparatus (105) 105 to capture a QoE event through a video clip according to an embodiment. At operation 905, a report interval start time is initialized. Next, at operation 910, a determination is made whether an YUV image and an audio frame is received. If so, then flow moves to operation 915, otherwise flow moves to operation 950 where operations end. Operations 915-925 create and store a video clip in the automation testing apparatus (105) 105. At operation 915, the video and audio is encoded. A number of different encoding methods may be used such as H.264 (AVC/MPEG-4 Part 10), and H.265 (HEVC/MPEG-H Part 2). Of course, other encoding methods may be used. Next, at operation 920, the encoded audio and video streams are multiplexed. Next, at operation 925, the multiplexed AV stream is saved to temporary memory of the automation testing apparatus (105) 105. Next, at operation 930, a determination is made whether the report interval time has expired. The report interval time may be set by an operator of the automation testing apparatus (105) in an embodiment. By way of example, the report interval may be ten seconds, meaning that ten seconds of AV may be captured in each video clip. If the report interval has not expired, then flow moves back to operation 910 and additional image and audio frames may be added to the video clip. If the report interval time has expired, then flow moves to operation 935. At operation 935, a determination is made whether a QoE event has occurred during the time of the AV of the generated video clip. For instance, the automation testing apparatus (105) 105 may access the QoE event data store 170 to determine whether a QoE event was detected during the timeframe of the generated video clip. If an AV QoE event occurred, then flow moves to operation 945 where the generated video clip is moved from temporary memory to non-volatile memory (e.g., stored in the QoE event data store 170). This allows the video clip to be accessed later by a tester to review the detected AV artifact to verify and/or troubleshoot the problem. Flow then moves from operation 945 back to operation 910. If an AV QoE event did not occur, then flow moves to operation 940 where the video clip saved in temporary memory is discarded and flow then moves back to operation 910.

Figure 10:
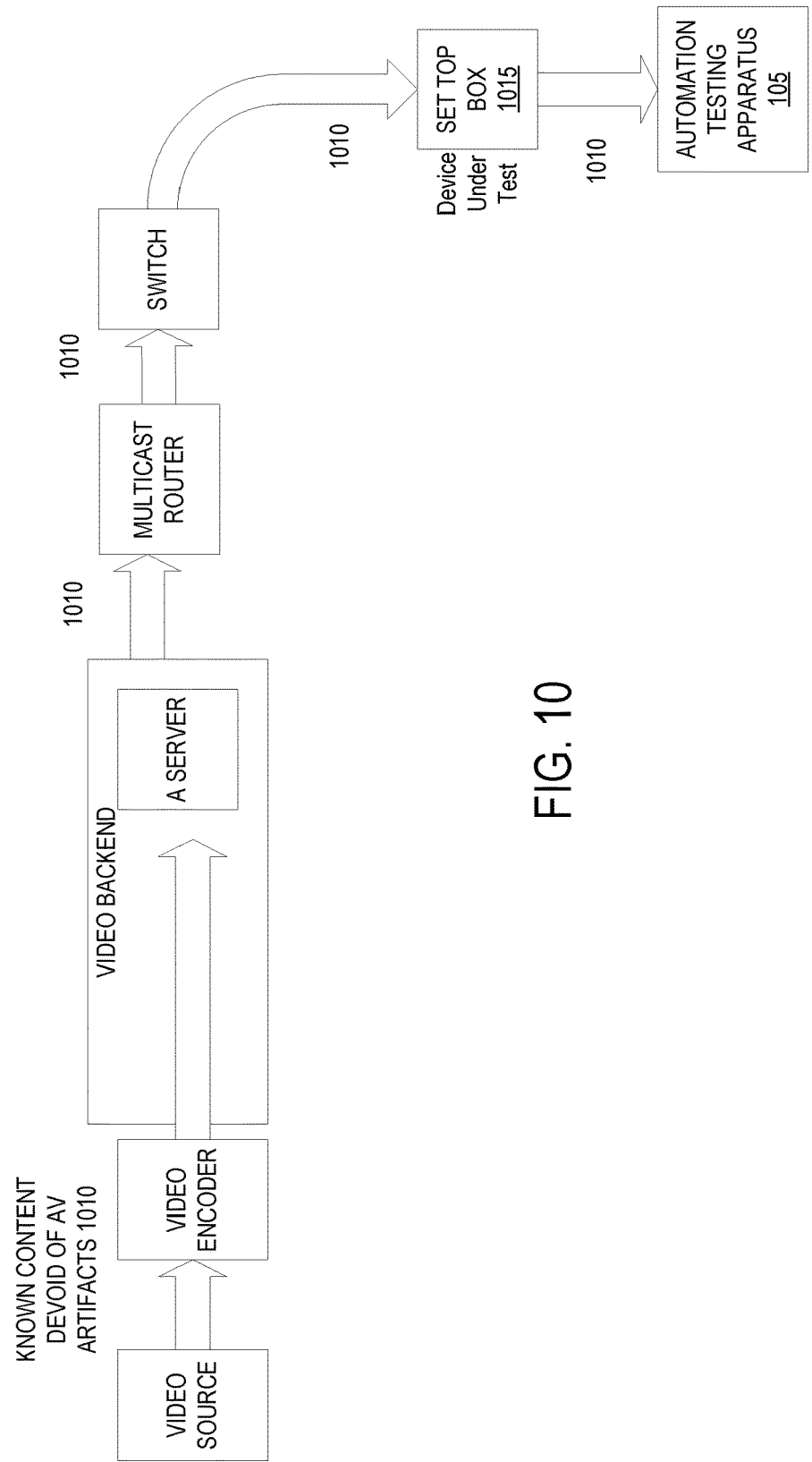
FIG. 10 illustrates an environment where the automation testing apparatus may be used in an embodiment.

FIG. 10 illustrates an environment where the automation testing apparatus (105) may be used in an embodiment. The known content that is devoid of any AV artifacts 1010 may be sent by the video source and travel through a managed or unmanaged network, which may go through various network elements to distribute the video from the source to the device under test, which in the example in FIG. 10 is the set top box 1015. Testing the AV at the very end point of the video broadcast system allows the tester to simulate the end user experience.

The techniques shown in the figures can be implemented using code and data stored and executed on one or more electronic devices (e.g., an automation testing apparatus (105)). Such electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., an automation testing apparatus (105)) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for monitoring quality of experience (QoE) using a no-reference (NR) method, comprising:
   receiving an uncompressed audio/video (AV) stream from output of a device under test (DUT), wherein the uncompressed AV stream includes content that is known to be devoid of a set of one or more AV artifacts;
   automatically testing the received uncompressed AV stream for at least one of the set of AV artifacts using a no-reference method that does not use a comparison to an input reference AV stream;
   upon determining that there is an AV event representing one of the set of AV artifacts based on the automatic testing, automatically generating a video clip that includes the AV event; and
   storing the automatically generated video clip.

2. The method of claim 1, wherein at least one of the set of one or more AV artifacts being tested is blockiness, and wherein testing for blockiness includes performing the following:
   dividing the uncompressed AV stream into an uncompressed video stream; and
   for each image of the uncompressed video stream, performing the following:
      dividing that image into a plurality of blocks,
      for each of the blocks, detecting and calculating a number of edges for that block,
      accumulating a number of edges of the image,
      calculating a density of edges of the image relative to the accumulated number of edges of the image, and
      determining that a blockiness artifact exists when the calculated density is greater than a threshold that indicates that the image is perceivably blocky.

3. The method of claim 1, wherein at least one of the set of one or more AV artifacts being tested is a video freeze artifact, wherein testing for the video freeze artifact includes performing the following:
   computing a difference of pixel values of a current image of the received uncompressed AV stream with pixel values of a most immediately previous image of the received uncompressed AV stream; and
   determining that the video freeze artifact exists when a difference between the pixel values of the current image and the pixel values of the most immediately previous image is below a threshold that indicates that the current image is perceivably a same as the most immediately previous image.

4. The method of claim 1, wherein at least one of the set of one or more AV artifacts being tested is a jerkiness artifact, wherein testing for the jerkiness artifact includes performing the following:
   computing a difference of an arrival time of a current image of the received uncompressed AV stream with an arrival time of a most immediately previous image of the received uncompressed AV stream to determine an observed framerate;
   computing a difference between the observed framerate and an expected framerate of the AV stream; and
   determining that the jerkiness artifact exists when a difference between the observed framerate and the expected framerate is greater than a tolerance threshold that indicates that the observed framerate is perceivably different than the expected framerate.

5. The method of claim 1, wherein at least one of the set of one or more AV artifacts being tested is a black frame artifact, wherein testing for the black frame artifact includes performing the following:
 computing an average of pixel values of a current image of the received uncompressed AV stream;
 computing a standard deviation of the pixel values of the current image; and
 determining that the black frame artifact exists when the computed average is below a luminance threshold and the computed standard deviation is less than a deviation threshold which indicates that the current image is perceivably a black frame.

6. The method of claim 1, wherein at least one of the set of one or more AV artifacts being tested is an audio loss artifact, wherein testing for the audio loss artifact includes performing the following:
 computing an audio level of an audio frame of the received uncompressed AV stream; and
 determining that an audio loss artifact exists when the computed audio level is equal or substantially equal to an audio level that cannot be perceived by a human.

7. The method of claim 1, wherein at least one of the set of one or more AV artifacts being tested is an audio loudness artifact, wherein testing for the audio loudness artifact includes performing the following:
 computing an audio level of an audio frame of the received uncompressed AV stream; and
 determining that an audio loudness artifact exists when the computed audio level is greater than an audio loudness threshold that indicates the audio level of the audio frame is perceivably louder than expected.

8. An automation testing apparatus for monitoring quality of experience (QoE) using a no-reference (NR) method, comprising:
 a non-transitory machine-readable storage medium that provides instructions that, if executed by the automation testing apparatus, will cause the automation testing apparatus to perform operations comprising:
  receive an uncompressed audio/video (AV) stream from output of a device under test (DUT), wherein the uncompressed AV stream is to include content that is known to be devoid of a set of one or more AV artifacts;
  automatically test the received uncompressed AV stream for at least one of the set of AV artifacts using a no-reference method that does not use a comparison to an input reference AV stream;
  upon a determination that there is an AV event representing one of the set of AV artifacts based on the automatic testing, automatically generate a video clip that includes the AV event; and
  store the automatically generated video clip.

9. The automation testing apparatus of claim 8, wherein at least one of the set of one or more AV artifacts being tested is blockiness, and wherein the non-transitory machine-readable storage medium further provides instructions that, if executed by the automation testing apparatus, will cause the automation testing apparatus to perform operations to test for blockiness including:
 divide the uncompressed AV stream into an uncompressed video stream; and
 for each image of the uncompressed video stream, perform the following:
  divide that image into a plurality of blocks,
  for each of the blocks, detect and calculate a number of edges for that block,
  accumulate a number of edges of the image,
  calculate a density of edges of the image relative to the accumulated number of edges of the image, and
  determine that a blockiness artifact exists when the calculated density is greater than a threshold that indicates that the image is perceivably blocky.

10. The automation testing apparatus of claim 8, wherein at least one of the set of one or more AV artifacts being tested is a video freeze artifact, and wherein the non-transitory machine-readable storage medium further provides instructions that, if executed by the automation testing apparatus, will cause the automation testing apparatus to perform operations to test for the video freeze artifact including:
 compute a difference of pixel values of a current image of the received uncompressed AV stream with pixel values of a most immediately previous image of the received uncompressed AV stream; and
 determine that the video freeze artifact exists when a difference between the pixel values of the current image and the pixel values of the most immediately previous image is below a threshold that indicates that the current image is perceivably a same as the most immediately previous image.

11. The automation testing apparatus of claim 8, wherein at least one of the set of one or more AV artifacts being tested is a jerkiness artifact, and wherein the non-transitory machine-readable storage medium further provides instructions that, if executed by the automation testing apparatus, will cause the automation testing apparatus to perform operations to test for the jerkiness artifact including:
 compute a difference of an arrival time of a current image of the received uncompressed AV stream with an arrival time of a most immediately previous image of the received uncompressed AV stream to determine an observed framerate;
 compute a difference between the observed framerate and an expected framerate of the AV stream; and
 determine that the jerkiness artifact exists when a difference between the observed framerate and the expected framerate is greater than a tolerance threshold that indicates that the observed framerate is perceivably different than the expected framerate.

12. The automation testing apparatus of claim 8, wherein at least one of the set of one or more AV artifacts being tested is a black frame artifact, and wherein the non-transitory machine-readable storage medium further provides instructions that, if executed by the automation testing apparatus, will cause the automation testing apparatus to perform operations to test for the black frame artifact including:
 compute an average of pixel values of a current image of the received uncompressed AV stream;
 compute a standard deviation of the pixel values of the current image; and
 determine that the black frame artifact exists when the computed average is below a luminance threshold and the computed standard deviation is less than a deviation threshold which indicates that the current image is perceivably a black frame.

13. The automation testing apparatus of claim 8, wherein at least one of the set of one or more AV artifacts being tested is an audio loss artifact, and wherein the non-transitory machine-readable storage medium further provides instructions that, if executed by the automation testing apparatus, will cause the automation testing apparatus to perform operations to test for the audio loss artifact including:
 compute an audio level of an audio frame of the received uncompressed AV stream; and determine that an audio loss artifact exists when the computed audio level is equal or substantially equal to an audio level that cannot be perceived by a human.

14. The automation testing apparatus of claim 8, wherein at least one of the set of one or more AV artifacts being tested is an audio loudness artifact, and wherein the non-transitory machine-readable storage medium further provides instructions that, if executed by the automation testing apparatus, will cause the automation testing apparatus to perform operations to test for the audio loudness artifact including:
compute an audio level of an audio frame of the received uncompressed AV stream; and
determine that an audio loudness artifact exists when the computed audio level is greater than an audio loudness threshold that indicates the audio level of the audio frame is perceivably louder than expected.

15. A non-transitory machine-readable storage medium that provides instructions that, if executed by a processor, will cause said processor to perform operations comprising:
receive an uncompressed audio/video (AV) stream from output of a device under test (DUT), wherein the uncompressed AV stream is to include content that is known to be devoid of a set of one or more AV artifacts;
automatically test the received uncompressed AV stream for at least one of the set of AV artifacts using a no-reference method that does not use a comparison to an input reference AV stream;
upon a determination that there is an AV event representing one of the set of AV artifacts based on the automatic testing, automatically generate a video clip that includes the AV event; and
store the automatically generated video clip.

16. The non-transitory machine-readable storage medium of claim 15, wherein at least one of the set of one or more AV artifacts being tested is blockiness, and wherein the non-transitory machine-readable storage medium further provides instructions that, if executed by the processor, will cause said processor to perform operations to test for blockiness including:
divide the uncompressed AV stream into an uncompressed video stream; and
for each image of the uncompressed video stream, perform the following:
divide that image into a plurality of blocks,
for each of the blocks, detect and calculate a number of edges for that block,
accumulate a number of edges of the image,
calculate a density of edges of the image relative to the accumulated number of edges of the image, and
determine that a blockiness artifact exists when the calculated density is greater than a threshold that indicates that the image is perceivably blocky.

17. The non-transitory machine-readable storage medium of claim 15, wherein at least one of the set of one or more AV artifacts being tested is a video freeze artifact, and wherein the non-transitory machine-readable storage medium further provides instructions that, if executed by the processor, will cause said processor to perform operations to test for the video freeze artifact including:
compute a difference of pixel values of a current image of the received uncompressed AV stream with pixel values of a most immediately previous image of the received uncompressed AV stream; and
determine that the video freeze artifact exists when a difference between the pixel values of the current image and the pixel values of the most immediately previous image is below a threshold that indicates that the current image is perceivably a same as the most immediately previous image.

18. The non-transitory machine-readable storage medium of claim 15, wherein at least one of the set of one or more AV artifacts being tested is a jerkiness artifact, and wherein the non-transitory machine-readable storage medium further provides instructions that, if executed by the processor, will cause said processor to perform operations to test for the jerkiness artifact including:
compute a difference of an arrival time of a current image of the received uncompressed AV stream with an arrival time of a most immediately previous image of the received uncompressed AV stream to determine an observed framerate;
compute a difference between the observed framerate and an expected framerate of the AV stream; and
determine that the jerkiness artifact exists when a difference between the observed framerate and the expected framerate is greater than a tolerance threshold that indicates that the observed framerate is perceivably different than the expected framerate.

19. The non-transitory machine-readable storage medium of claim 15, wherein at least one of the set of one or more AV artifacts being tested is a black frame artifact, and wherein the non-transitory machine-readable storage medium further provides instructions that, if executed by the processor, will cause said processor to perform operations to test for the black frame artifact including:
compute an average of pixel values of a current image of the received uncompressed AV stream;
compute a standard deviation of the pixel values of the current image; and
determine that the black frame artifact exists when the computed average is below a luminance threshold and the computed standard deviation is less than a deviation threshold which indicates that the current image is perceivably a black frame.

20. The non-transitory machine-readable storage medium of claim 15, wherein at least one of the set of one or more AV artifacts being tested is an audio loss artifact, and wherein the non-transitory machine-readable storage medium further provides instructions that, if executed by the processor, will cause said processor to perform operations to test for the audio loss artifact including:
compute an audio level of an audio frame of the received uncompressed AV stream; and
determine that an audio loss artifact exists when the computed audio level is equal or substantially equal to an audio level that cannot be perceived by a human.

21. The non-transitory machine-readable storage medium of claim 15, wherein at least one of the set of one or more AV artifacts being tested is an audio loudness artifact, and wherein the non-transitory machine-readable storage medium further provides instructions that, if executed by the processor, will cause said processor to perform operations to test for the audio loudness artifact including:
compute an audio level of an audio frame of the received uncompressed AV stream; and
determine that an audio loudness artifact exists when the computed audio level is greater than an audio loudness threshold that indicates the audio level of the audio frame is perceivably louder than expected.

* * * * *